March 29, 1960
R. W. COOK
2,930,491
NEW AND USEFUL IMPROVEMENTS RELATING
TO RAILWAY BUFFING GEAR
Filed June 17, 1958
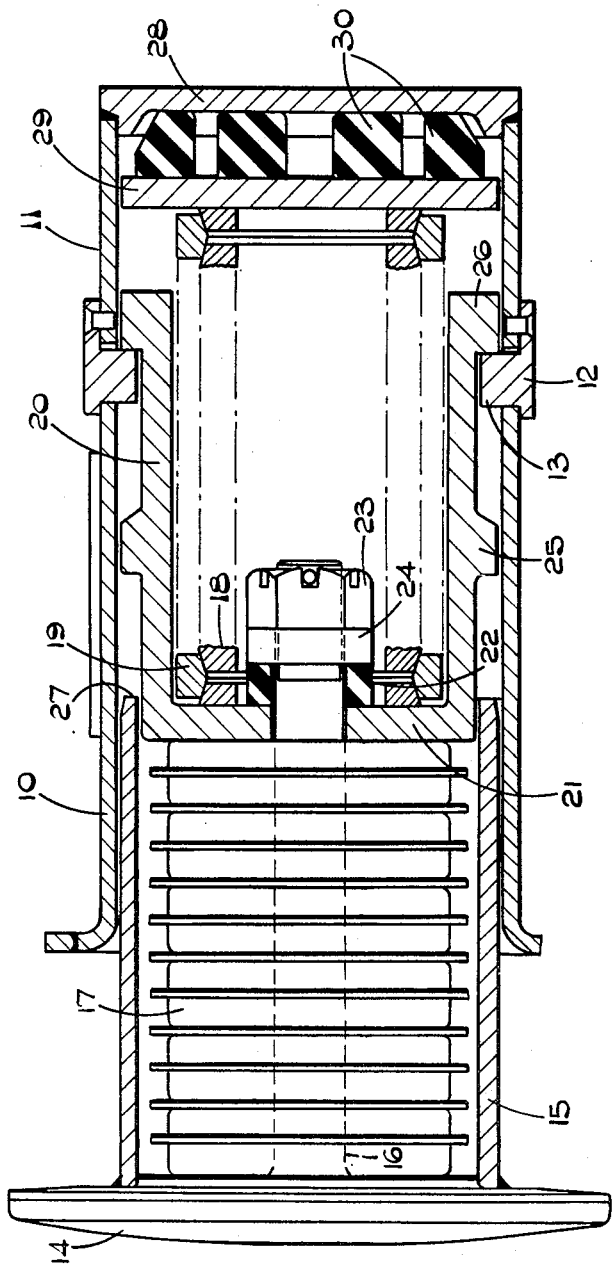
INVENTOR
Robert Welton Cook
BY
A. Yates Dowell
ATTORNEY

United States Patent Office 2,930,491
Patented Mar. 29, 1960

2,930,491

NEW AND USEFUL IMPROVEMENTS RELATING TO RAILWAY BUFFING GEAR

Robert Welton Cook, Stowe Cottage, Great Comberton, England, assignor to Garringtons Limited, Darlaston, England, a British company Application June 17, 1958, Serial No. 742,638

Claims priority, application Great Britain August 30, 1957

5 Claims. (Cl. 213—221)

This invention relates to buffing gear for railway and like usage and is concerned with the arrangement of spring devices incorporated in such gear for the absorption of energy of impact when buffing loads are applied.

One object of the present invention is to provide an improved arrangement of spring devices which will be efficient in dealing with overloads and shock loads as well as with normal operational loads.

Another object of the invention is to provide an improved arrangement of spring devices which will reduce substantially the proportion of any overload or shock load which is taken upon the actual structure of a vehicle to which the buffing gear is attached. According to the present invention I provide buffing gear for railway and the like usage wherein the spring devices comprise a primary spring assembly of rubber-metal sandwiches in series and a secondary spring assembly of a much higher degree of stiffness than the primary spring assembly, the primary spring assembly being disposed so as to operate by being compressed between a movable impact receiving member and one end of the secondary spring assembly, the other end whereof is arranged to bear against a backing member which is fixed relative to the impact receiving member.

The primary spring assembly may consist of a generally known type of rubber spring which comprises a number of rubber-metal sandwiches arranged in series so that a load transmitted axially to one end of the spring acts directly on all the sandwiches which are compressed successively and this form of spring is able to instantly absorb initial shock by virture of its high degree of deflection under relatively low load.

For the secondary spring assembly I prefer to use a generally known form of metal ring spring which comprises a series of outer and inner metal rings, the outer peripheries of the inner rings having tapered surfaces which co-act with correspondingly tapered surfaces on the inner peripheries of the outer rings tend to expand and the inner rings contract. This form of spring is capable of absorbing a large controlled amount of energy for a relatively small deflection and when the load is removed the energy stored in the spring is released by a gradual reaction so that there is no violent dissipation of energy and no violent reaction shock is imposed upon the structure.

With such an arrangement, therefore, the rubber primary spring assembly provides the instant initial high degree of deflection for a relatively low load whilst the stiffer secondary spring assembly provides the much higher resistance required for cushioning overloads and shock loads.

The buffer may be of the type having a buffer head which has an impact receiving member fixed to the outer end of a sleeve which telescopes within an outer housing sleeve and the end of such outer housing remote from the buffer head may be closed and there may be provided a further resilient spring member interposed between this end of the outer housing and the end of the secondary spring assembly for the purpose of accommodating any very severe overload and preventing such severe overload from being transmitted directly to the structure to which the buffer is attached.

The invention is illustrated, by way of example, in the accompanying drawing which shows a section through a railway buffer constructed in accordance with the invention.

In the example shown in the drawing, the buffer has an outer housing in the form of a sleeve, there being a forward part 10 and a rearward part 11. Detachably mounted on this outer housing are a number of lug members 12 having abutment portions 13 which project into the housing and form abutment means for a purpose hereinafter referred to.

The impact receiving member of the buffer comprises the buffer head 14 fixed to one end of the sleeve 15 and this sleeve 15 is slidable telescopically within the outer housing at the forward end thereof.

The buffer head 14 has extending from the rear thereof an axial stem 16 and the primary spring assembly 17 in the form of rubber-metal sandwiches in series is mounted about the stem 16.

The secondary spring assembly comprises a known arrangement having a series of inner metal rings 18 and outer metal rings 19 which have, as shown, co-operating tapered surfaces and this secondary spring assembly is contained within an inner housing sleeve 20 which is closed at its forward end 21 except for a central circular aperture through which passes the rearward end of the stem 16.

The primary spring assembly, therefore, acts between the rear face of the buffer head 14 and the forward end 21 of the inner housing 20, and the end of the stem 16 which is within the inner housing 20 is threaded and has mounted thereon a rubber recoil ring 22 held in place of the stem by a retaining nut 23 and washer 24.

Intermediate its ends the inner housing member 20 is formed with an externally radially projecting shoulder 25 and at its open end it has a radially extending flange 26 which engages with the inwardly extending abutment portions 13 to limit the outward travel of the inner housing 20 when it is being urged outwardly upon expansion of the secondary spring assembly.

When in operation, any load which is heavy enough to completely, or substantially completely compress the primary spring assembly 17 results in the inner peripheral edge 27 of the sleeve 15 coming into engagement with the abutment shoulder 25 on the inner housing sleeve so that the load is then imposed upon the secondary spring assembly.

At its end remote from the buffer head the secondary spring assembly bears against a backing member which, as shown, comprises the fixed end plate 28 closing the end of the outer housing in combination with a backing plate 29 and a substantial rubber spring disposed in between the backing plate 29 and the end plate 28 and this rubber spring may be in the form of rings 30 which may be bonded to either or both the backing plate 29 and end plate 28.

What I claim then is:

1. A railway buffer comprising; a fixed outer housing sleeve of circular cross-section, an end plate rigidly secured in one end of said housing sleeve, an impact-receiving sleeve of circular cross-section slidable telescopically within the other end of said outer housing sleeve, a buffer head secured to the outer end of said impact receiving sleeve, an inner housing sleeve of circular cross-section mounted for axial sliding movement within said outer housing sleeve between said impact-receiving sleeve and said end plate, one end of said inner housing sleeve being slidably telescopically within the inner end of said impact-receiving sleeve, a primary spring assembly of rubber-metal sandwiches in series disposed within said impact-receiving sleeve and acting between the rear of said buffer head and the said end of the inner housing member, a secondary spring assembly of substantially higher degree of stiffness than the primary spring assembly disposed within said inner housing member and acting between the said end plate of the outer housing sleeve and the said end of the main housing member, a stem secured to and extending axially from the rear of said buffer head, said stem passing slidably through an aperture provided centrally in the said end of the inner housing sleeve, a nut, of larger dimensions than said aperture, secured on the free end of said stem within the inner housing member, first abutment means on the exterior surface of said inner housing sleeve intermediate the ends thereof engageable by the inner end of said impact-receiving sleeve upon compression of said primary spring assembly, second abutment means projecting inwardly from said outer housing sleeve and outwardly extending flange means on the other end of the inner housing sleeve engageable with said second abutment means to limit the travel of said inner housing sleeve away from said end plate.

2. A railway buffer according to claim 1, having the secondary spring assembly engaging at one end with a backing plate located adjacent the end plate of the outer housing sleeve and having a rubber spring of ring-like form operatively disposed between said backing plate and the fixed end plate of the outer housing.

3. A railway buffer according to claim 1 wherein a rubber recoil spring is disposed about the free end of the said stem where it extends within the inner housing sleeve, said recoil spring acting between the nut on said stem and the said end of the inner housing sleeve.

4. A railway buffer according to claim 1 wherein the first abutment means comprises an integral radially extending shoulder on the interior of the inner housing sleeve located substantially mid-way between the ends thereof.

5. A railway buffer according to claim 1, wherein the second abutment means comprises a plurality of lug members secured to the outer housing sleeve and having abutment portions projecting inwardly through the outer housing sleeve into the interior thereof.

References Cited in the file of this patent

UNITED STATES PATENTS

| | | |
|---|---|---|
| 932,489 | Muney | Aug. 31, 1909 |
| 1,178,677 | Pries | Apr. 11, 1916 |
| 2,212,843 | Metzger | Aug. 27, 1940 |
| 2,430,494 | Dath | Nov. 11, 1947 |
| 2,458,572 | Dentler | Jan. 11, 1949 |
| 2,548,088 | Williams | Apr. 10, 1951 |
| 2,686,667 | Willison et al. | Aug. 17, 1954 |
| 2,713,483 | Tillou | July 19, 1955 |